July 14, 1959
O. H. BANKER
2,894,533
CLOSED CENTER VALVE AND SYSTEM
Filed Aug. 26, 1955
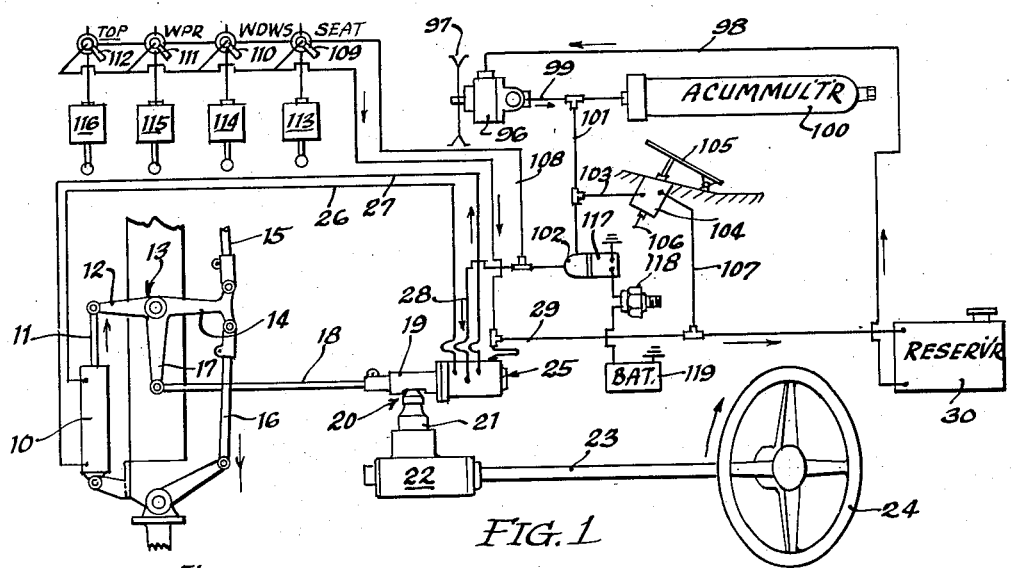
FIG. 1
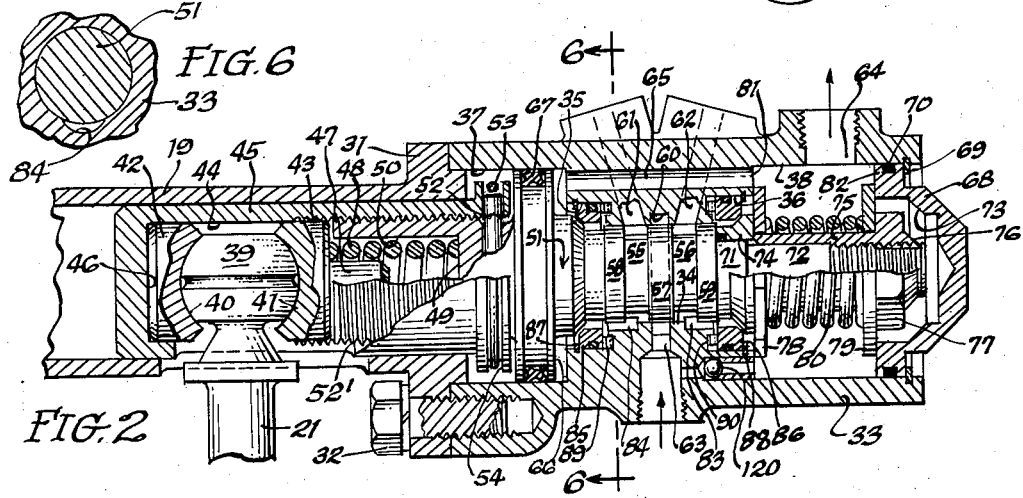
FIG. 6
FIG. 2
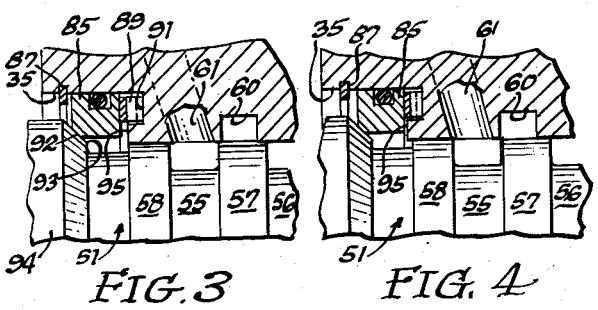
FIG. 3
FIG. 4
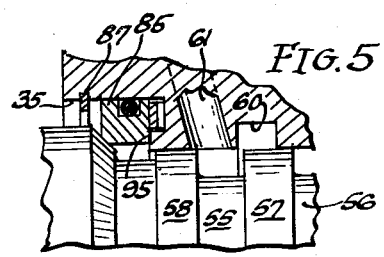
FIG. 5
INVENTOR.
Oscar H. Banker
BY Charles F. Vrytech
Attorney

United States Patent Office 2,894,533
Patented July 14, 1959

2,894,533

CLOSED CENTER VALVE AND SYSTEM

Oscar H. Banker, Evanston, Ill., assignor to New Products Corporation, Skokie, Ill., a corporation of Delaware Application August 26, 1955, Serial No. 530,703

6 Claims. (Cl. 137—622)

This invention relates to a valve which is particularly well adapted for use in a hydraulically operated power steering system, and to a system incorporating such valve together with a safety feature therefor.

It has been proposed to control the steering mechanism of an automobile through a double acting hydraulic cylinder which, in turn, is controlled by a valve actuated by the mechanism associated with the steering wheel of the automobile. In such prior design the valve was so constructed that fluid from a pump or other pressurizing source was admitted to the valve through a central port and then to either side of the port through passages leading to both sides of the double acting cylinder as well as to vent openings connected back to the reservoir. Movement of the valve in either direction caused the vent opening on the opposite side of the valve to be closed, thereby allowing pressure to build up on the corresponding side of the hydraulic cylinder and thus effect a steering movement of the apparatus controlled thereby.

It has also been proposed to operate a number of devices in a vehicle with auxiliary power, in some cases vacuum, in other cases electrical, and in yet other cases hydraulic. Thus, in a convertible type of passenger automobile having a folding top, hydraulic means may be provided for operating the mechanism for folding and unfolding said top. The same vehicle may have vacuum or electric operated mechanism for operating the windshield wiper and electrical means for operating the windows and for moving the front seat longitudinally of the car. Such vehicle may also be provided with power operated brakes using vacuum or hydraulic work cylinders. In order to simplify the several power mechanisms used in the foregoing devices it is desirable to make them all of one kind, that is, to operate all of the power operated devices with hydraulic motors, using a single pump to supply the fluid under pressure, and preferably using an accumulator to reduce the size of the pump required to handle all of the above devices. If, however, a power steering valve of the open center type, such as is described above, is used, it cannot be used with the unified hydraulic system inasmuch as it would continuously vent the fluid pressure as long as the vehicle travelled a steady course requiring no movement of the steering wheels.

It is an object of this invention, therefore, to provide a control valve for a hydraulic power steering system wherein the valve is normally closed except when it is desired to operate the power steering device.

As another object, this invention seeks to provide a control valve for a power steering system of the hydraulic type having a central inlet opening on either side of which are symmetrically disposed the passages leading to opposite sides of the hydraulic cylinder controlled by the valve, with means for creating a reaction pressure in opposition to the force imparted to the steering wheel of the system by the driver in order to provide a steering sensation similar to that obtained in a manually operated steering system.

In a system which includes a plurality of hydraulically operated devices, all operated from the same pump and accumulator, wherein one of the hydraulically operated devices is a power operated brake for the vehicle, it is possible that when the engine is not running the entire system may be drained through slow leakage at the several control valves for the hydraulically operated devices. With the hydraulic power thus dissipated, the vehicle would be without brakes until the engine started, and in the event of an inadvertent roll of the vehicle down an incline with the engine dead the driver would be powerless to stop the vehicle.

It is accordingly another object of this invention, in a hydraulic system for a motor vehicle or the like utilizing a single source of fluid under pressure augmented by an accumulator or the like, and having a plurality of hydraulically operated devices operated from the single source including a power operated brake, to provide means for preventing the application of fluid under pressure from the accumulator to all of the devices except the power operated brake at such times when the engine is not running.

A more specific object of this invention is the provision of means in a hydraulic system for automotive vehicles or the like incorporating an accumulator for storing fluid under pressure, and having hydraulically operated brakes operated from said accumulator, for positively preventing the passage of fluid from the accumulator to all but the hydraulic brakes when the pressure of the engine lubricating system drops substantially to zero.

These and other objects of this invention will become apparent from the following detailed description when taken together with the accompanying drawings in which, Fig. 1 is a diagrammatic representation of a hydraulic system incorporating the valve and safety mechanism of mobile including the steering mechanism and brakes, said system incorporating the valve and safety mechanism of this invention;

Fig. 2 is a section through the valve controlling the application of fluid under pressure to the power cylinder for operating the steering mechanism;

Figs. 3, 4 and 5 are greatly enlarged fragmentary views of a portion of the valve of Fig. 2 each view showing the valve in a different stage of operation; and Fig. 6 is a fragmentary section through a portion of the valve of Fig. 2, the section being taken along line 6—6 thereof.

Adverting briefly to Fig. 1, the system therein disclosed includes a hydraulically operated cylinder 10 the piston rod 11 of which is connected to one arm 12 of a pivoted lever 13, another arm 14 of which is connected through suitable arms 15 and 16 to the steering wheels of the vehicle. A third arm 17 of lever 13 is connected through a rod 18 secured to the housing 19 of a knuckle joint 20 connecting said rod 18 to an oscillatible crank 21. Said crank 21 is driven through a worm and sector drive 22 from the steering column 23 and steering wheel 24 of the vehicle.

Although the steering mechanism thus far described may be operated mechanically through the rod 18 and arm 17, it is primarily operated hydraulically through the cylinder 10, piston rod 11 and arm 12, the cylinder being controlled by the closed center valve 25 of this invention which controls the application of fluid under pressure to said cylinder 10 through pipes 26 and 27 connected to opposite sides of the cylinder and selectively connectible through the valve either to a pipe 28 adapted to contain fluid under pressure, or to a vent pipe 29 connected to reservoir 30. Inasmuch as valve 25 swings with the oscillating crank 21, the connections from the valve to the pipes 26, 27, 28 and 29 include flexible hose connections of known construction.

The details of construction of the valve 25 are shown more clearly in Fig. 2, to which reference is now made. It may be apparent from that figure that housing 19 terminates in a flange 31 to which is secured by bolts 32 a substantially cylindrical valve housing 33 having a centrally disposed valve bore 34 therein. Said valve bore has spaced counterbores 35 and 36 at the ends thereof terminating in still larger counterbores 37 and 38, respectively.

Knuckle joint 20 is comprised of a ball 39 formed on the end of crank 21 and received between the frustospherical surfaces 40 and 41 formed on diametrically opposed thrust members 42 and 43. Said thrust members are received in a recess 44 formed in a cylinder 45 slidably received within housing 19. Thrust member 42 is adapted to abut on the bottom 46 of recess 44 so that thrust of the ball 39 to the left as viewed in Fig. 6 is transmitted through the thrust member 42 to cylinder 45 when member 42 strikes the bottom 46 on the recess.

Thrust member 43 has a pin 47, preferably formed integrally therewith and centrally disposed with respect to cylinder 45, which centers a compression spring 48 acting upon member 43 at one end and upon the bottom 49 of a recess 50 formed in the left hand end as viewed in Fig. 2 of the valve 51. Said valve 51 is constrained to move with cylinder 45 by the threaded connection 52' between them, the connection being locked by a pin 52 extending radially through suitable aligned openings in the valve and cylinder and retained in place by a snap ring 53 received in a peripheral groove 54 and passing over the ends of the pin receiving openings in cylinder 45.

The operative portion of valve 51 extends into valve bore 34 with a sliding, fluid-tight fit, and is formed with a pair of peripherally disposed grooves 55 and 56 which form between them a central land 57, and spaced end lands 58 and 59. An internal groove 60 is formed in bore 34, said internal groove being of lesser axial extent than the axial dimension of central land 57. A pair of drilled passages 61 and 62 are formed in valve housing 33 and are disposed with their inner ends in communication with grooves 55 and 56, respectively. Said drilled passages 61 and 62 are connected to pipes 26 and 27 which, it may be recalled, conduct the fluid to and from the opposite sides of hydraulic cylinder 10. A drilled passage 63 connects internal groove 60 with pipe 28 leading to the source of fluid under pressure. A side opening 64 in housing 33 is connected to pipe 29 leading to the reservoir, said opening 64 being connectable through the valve 51 and other means hereinafter to be described to one or the other of the passages 61 and 62 to permit the side of the cylinder which is not working to be drained.

Counterbores 37 and 38 are in hydraulic communication with one another at all times through an axial passage 65. Counterbore 37 is sealed with respect to valve 51 by a grooved flange 66 in which is received a suitable packing ring 67 compressed radially between the flange and counterbore 37. Counterbore 38 is sealed with respect to the exterior of valve housing 33 by a cap 68 retained in counterbore 38 by a snap ring 69 and sealed with respect to counterbore 38 by an O-ring type of packing 70.

The right-hand end of valve 51 as viewed in Fig. 2 has a first reduced portion 71 and a second reduced portion 72, the latter extending through counterbore 38 and into a recess 73 formed on the interior of cap 68. A tapered ring 74 encircles first reduced portion 71 and is sealed with respect thereto. A sleeve 75 is threaded on second reduced portion 72 and locked in place thereon by a stake 76, said sleeve 75 having a hexagonal flange 77 in the right-hand end thereof as viewed in Fig. 2 for cooperation with a wrench to tighten the sleeve against ring 74, and the later against the side of land 59.

Ring 74 and the flange 77 form radially extending abutments against which washers 78 and 79, respectively, may be held by a compression spring 80 encircling sleeve 75. The outer peripheral side regions of the washers 78 and 79 bear one against a shoulder 81 defining the end of counterbore 38 and the other against the inner radial surface 82 of cap 68. Thus, should valve 51 be moved to the right as viewed in Fig. 2, such movement will be resisted by spring 80 reacting against washer 79 and cap 68, conversely, should valve 51 be moved to the left as viewed in Fig. 2, such movement will be resisted by spring 80 and washer 78 abutting on shoulder 81. With no external force acting on the valve in either direction, spring 80 and washers 78 and 79 serve to hold valve 51 in such position in valve bore 34 that central land 57 completely blocks internal groove 60 and thereby prevents fluid under pressure from passage 63 and pipe 28 from draining pipe 28 and the accumulator and pump connected thereto.

Fluid under pressure may be connected selectively either to passage 61 or passage 62 by movement of valve 51 to the right or left as viewed in Fig. 2. Thus, when valve 51 is moved to the right, the normal resistance of the steering mechanism to such movement will tend to hold housings 19 and 33 relatively stationary, thereby causing relative movement between valve 51 and valve housing 33 so as to bring groove 55 into partial alignment with groove 60 and thus to admit fluid under pressure from groove 60 through groove 55 to drilled passage 61 leading to the side of cylinder 10 adapted to effect a steering movement of the linkage between the cylinder and wheels in the direction in which the steering wheel 24 was turned. Simultaneously, the opposite side of the cylinder is drained through drilled passage 62, connecting groove 56, recess 83 forming a passage from groove 56 around land 59, to the exterior of tapered ring 74, and thence around the exterior of said ring 74 and between washer 78 and shoulder 81 to counterbore 38 and thence outwardly through opening 64 and pipe 29 to the reservoir 30. It may be recalled that washer 78 will be held away from shoulder 81 upon movement of valve 51 to the right as viewed in Fig. 2, from the position of the valve shown in that figure and will not impede the movement of the fluid to counterbore 38.

Similarly, movement of valve 51 to the left from the position shown in Fig. 2 brings drilled passage 62 into communication with groove 60 through groove 56, and permits drilled passage 61 to be vented through a recess 84 bridging land 58 and communicating with the exterior of valve 51 in counterbores 35 and 37, thence through axial passage 65 into counterbore 38, and then out through opening 64.

Isasmuch as recesses 83 and 84 provide a permanent by-pass around lands 59 and 58, respectively, it becomes necessary to seal off these recesses when it is desired to pressurize one or the other of the grooves 55 and 56 connected with said recesses 84 and 83. These seals are substantially identical for each recess and to simplify the description thereof, just the left-hand seal as viewed in Fig. 2 will be described.

Referring now to Figs. 2, 3, 4 and 5, it may be observed that each counterbore 35, 36 is provided with an externally grooved ring 85, 86, respectively, each ring having an O-ring packing in its groove to seal the ring with respect to its counterbore. Each ring is held in its counterbore by a snap ring 87, 88 which limits the movement of the ring out of its counterbore. Each ring 85, 86 is resiliently held against its snap ring by a wave type spring 89 and 90 respectively, each said wave type spring, as shown more clearly in Figs. 3, 4 and 5, being disposed in an annular recess such as 91 which is of slightly greater radial extent than the radial section of the spring to allow the spring to move freely in its recess. Any fluid entering the space formed between a ring 85 and its recess when the ring is held against its snap ring by the spring will also find its way to the side of the ring against which the spring bears and will be effective against the entire side to exert an axial thrust upon the ring in the same direction as the spring, assuming that the fluid at such times is under pressure.

Each ring 85 and 86 has a conical surface 92 formed in the radially inner corner thereof which is adapted to contact with a fluid tight fit a tapered surface 93 on valve 51. In the case of ring 85, the surface 93 on valve 51 is formed on a shoulder 94 disposed intermediate land 58 and flange 66. In the case of ring 86, the tapered surface is formed on the exterior of ring 74 which, it may be recalled, is axially fixed with respect to first reduced portion 71 of valve 51 by sleeve 75. When valve 51 occupies the position shown in Fig. 2, surfaces 92 and 93 are separated and provide a passage between ring 85 and valve 51. A similar situation obtains with respect to ring 86. In this position, both sides of cylinder 10 may be drained through the bridging recesses 83 and 84 and the spaces between rings 85, 86 and their respective conical surfaces on valve 51.

When it is desired to operate the steering mechanism, crank 21 is turned by its associated steering wheel 24 in a direction, for example, to effect a movement of valve 51 to the right as viewed in Figs. 2 to 5 inclusive. The first function that takes place is the closing of the space between ring 85 and valve 51 by contact between surfaces 92 and 93. This effects a seal for the fluid which would otherwise escape through the bridging recess 84. Land 57 at such time may occupy the position relative to internal groove 60 shown in Fig. 3. In this position, fluid under pressure from groove 60 is still prevented from entering groove 55. Continued movement of valve 51 to the right as viewed in Figs. 2 to 5 inclusive, effects a slight opening between grooves 60 and 55 to admit fluid under pressure into groove 55 and thence through bridging recess 84 to the recess 91, so that the fluid under pressure in groove 55 is also effective to urge ring 85 against valve 51. This unbalanced fluid pressure is transmitted back through the valve, spring 48 thrust member 43 and ball 39 to crank 21 and the linkage intermediate said crank and the steering wheel 24 and produces a sensation of a manual steering mechanism requiring only a fraction of the manual steering effort.

The presence of fluid under pressure behind ring 85 also produces a reaction in valve 51 tending to restore it to the position shown in Fig. 2. Fluid under pressure will therefore continue to flow through valve 51 to cylinder 10 to continue turning the vehicle wheels until driver pressure on the steering wheel ceases, whereupon the condition shown in Fig. 2 is immediately restored and cylinder 10 is held in the position then obtained.

In the event of a power failure, continued movement of the valve 51 to the right as viewed in Figs. 2 to 5 is possible because it is unopposed by fluid pressure and ultimately causes ring 85 to abut on radial surface 95 defining the inner end of counterbore 35. From that point on, a solid mechanical connection is effected between the steering wheel 24 and rod 18. Thus, should the power fail, the vehicle may nevertheless be steered mechanically through the rigid connection between valve body 51, ring 85 and radial surface 95.

It is understood that movement of valve 51 to the left as viewed in Figs. 2 to 5, inclusive, will cause a similar action to take place between ring 86 and tapered ring 74 to first seal the recess 83 from the counterbore 38 and drain or vent opening 64, then to produce the fluid reaction against such movement of the valve while effecting a steering movement of the piston in cylinder 10, and finally, in the event of a power failure to cause a solid mechanical connection to be made between the valve and valve housing through physical contact between rings 74 and 86.

Referring again to Fig. 1 for a description of a system incorporating the safety features of this invention, fluid under pressure may be provided for the entire system by a pump 96 driven by a pulley 97 from the fan belt of the engine, said pump having an intake pipe 98 connected to reservoir 30 and an outlet pipe 99 connected to an accumulator 100. It is understood that pump 96 may be provided with an appropriate unloader valve of any well known construction (not shown) by which fluid is diverted from accumulator 100 after said accumulator pressure reaches a predetermined value.

A branch 101 is connected to pipe 99 and is connected through a master control valve 102 to pipe 28. A branch 103 from branch 101 conducts the fluid under pressure to a brake valve 104 operated by a brake pedal 105 and adapted to supply under pressure to a pipe 106 leading to the brakes of the vehicle (not shown). Brake valve 104 is vented through a pipe 107 which may be connected to pipe 29 leading to reservoir 30.

A branch pipe 108 conducts fluid under pressure from pipe 28 to a series of valves 109, 110, 111 and 112 controlling the application of fluid under pressure to cylinders 113, 114, 115 and 116 which may control, respectively, movement of the front seat, the car windows, the windshield wiper and the folding top of a convertible type automobile. It is understood that other devices, or a different number of devices, may be operated from pipe 28, depending upon the construction of, and the equipment furnished with, the automobile.

To avoid an inadvertent drainage of the pressure in accumulator 100 after the engine is stopped and the vehicle has remained idle for some time, master valve 102 is operated by a solenoid shown schematically at 117 which, in turn, is controlled by a pressure operated switch 118 in series with the solenoid 117 and a battery 119. The opposite side of solenoid 117 is connected to ground as is also the other side of battery 119 to complete the electrical circuit between the battery 119 switch 118 and solenoid 117. Switch 118 is connected to the oil pressure line (not shown) of the engine so that the circuit through the switch is completed as long as the oil pressure in the engine lubricating system exceeds a predetermined amount, which may be slightly less than the normal pressure developed in the lubricating system of the engine when the engine is running. When the engine ceases to run, oil pressure drops to zero, and switch 118 opens, thereby deenergizing solenoid 117 and causing valve 102 to close. With valve 102 closed, pipe 28 and branch 108 are cut off from accumulator 100, and hence, any leakage which may occur in the devices connected to pipes 28 and 108 has no effect upon the pressure in the accumulator.

The cutting off of pressure in pipes 28 and 108, however, does not affect the availability of pressure for the operation of the vehicle brakes, since branch 103, which supplies such fluid under pressure to the brakes, is connected between the accumulator and valve 102. Thus, assuming that accumulator 100 contains fluid under pressure at the time the engine ceases to run the vehicle may be stopped or braked despite the fact that the engine is not running. The vehicle may likewise be steered due to the auxiliary solid mechanical connection between the steering wheel 24 and the steering rod 18. The operation of the engine on the starter does not develop sufficient pressure to operate switch 118 and hence, assuming some mechanical or electrical failure in the engine such as will prevent it from starting when turned by its starter mechanism, fluid pressure from the accumulator 100 will nevertheless be preserved since solenoid 117 will not operate under those conditions to open valve 102.

It may be noted that ring 86 is of greater diameter than ring 85 and of substantially the same cross section so that ring 86 will present a greater effective area to the fluid entering passage 62 than the effective area presented by ring 85 to the fluid in passage 61. It may be noted further that the side of cylinder 10 having the piston rod 11 extending therethrough has a smaller effective area than the opposite side of the cylinder. The turning effort exerted by rod 11 on arm 12, however, must be the same regardless of the direction in which the arm is turned so that the "feel" transmitted back to the driver will likewise be the same and hence the unit pressure on the side having the piston rod 11 must be greater than on the opposite side. This difference in unit pressure is obtained by connecting the piston rod side, through pipe 26, to passage 61 and ring 85 which is the smaller of the two rings and hence exerts a lesser force on valve 51 than ring 86 to close inlet port 60. Through the pressure reducing valve action which results from the specific construction and relationship of valve 51 and ring 85, valve 51 will remain open until a higher unit pressure is attained in passage 62.

In the event of a power failure such as is illustrated in Fig. 5, the piston in cylinder 10 will necessarily move with rod 11 and arm 12 of lever 13. Such movement cannot take place, however, unless the space behind the piston is continuously filled with fluid, otherwise a vacuum would be created which would resist movement of lever 13 and render manual steering impossible. To alleviate this situation a check valve 120 is placed intermediate inlet passage 63 and bore 38, the valve being closed when there is fluid under pressure in passage 63 and opened when the pressure in passage 63 drops below the pressure in bore 38. Since bore 38 is connected to the reservoir 30, a slight vacuum in bore 38 will draw oil from the reservoir into bore 38, past check valve 120 and into passage 63 from whence it is conducted through valve 51 to the side of cylinder 10 being evacuated by the manual movement of lever 13.

It is understood that the foregoing description is merely illustrative of a preferred embodiment of the invention and that the scope of the invention is not to be limited thereto but is to be determined by the appended claims.

I claim:

1. A piston valve comprising a valve body having an inlet port and an outlet port disposed axially of the inlet port, a valve element axially movable in the valve body, a land on the valve element normally closing the inlet port, said valve element upon axial movement thereof in the body uncovering the inlet port to establish communication between the inlet and outlet ports, an abutment on the valve element, and an axially movable abutment on the valve body adapted to be engaged by the abutment on the valve element, said movable abutment comprising a ring, means for sealing the ring with respect to the valve body, a fixed abutment on the valve body, resilient means compressed between the ring and fixed abutment urging the ring toward the abutment on the valve element, said valve element and ring having cooperating surfaces for establishing a fluid tight seal therebetween.

2. A piston valve comprising a valve body having an inlet port and an outlet port disposed axially of the inlet port, a valve element axially movable in the valve body, a land on the valve element normally closing the inlet port, said valve element upon axial movement thereof in the body uncovering the inlet port to establish communication between the inlet and outlet ports, an abutment on the valve element, and an axially movable abutment on the valve body adapted to be engaged by the abutment on the valve element, said movable abutment comprising a ring, means for sealing the ring with respect to the valve body, a fixed abutment on the valve body having an axially disposed recess therein, and resilient means in the recess and compressed between the ring and fixed abutment urging the ring toward the abutment on the valve.

3. A valve for controlling the operation of a double acting hydraulic cylinder or the like having a pressure differential operated element therein, said valve comprising a valve body movable with the pressure differential operated element, a manually operable valve slidable in the valve body, said valve body having an inlet port and an outlet port on each side axially of the inlet port, means establishing hydraulic communication between the outlet ports and each side of the pressure differential operated element, a land on the valve normally closing the inlet port, peripheral grooves one on either side of the land and each in substantial alignment with an outlet port, said valve upon axial movement thereof in the valve body bringing a peripheral groove into alignment with both the inlet and one outlet port, an abutment on the valve, an axially movable abutment on the valve body adapted to be engaged by the abutment on the valve, and means for subjecting the axially movable abutment to the pressure of the fluid in the peripheral groove in an axial direction to exert a force on the movable abutment in opposition to the manual force thereon, said movable abutment comprising a ring, means for sealing the ring with respect to the valve body, a fixed abutment on the valve body, resilient means compressed between the ring and fixed abutment urging the ring toward the abutment on the valve, said valve and ring having cooperating surfaces for establishing a fluid tight seal therebetween.

4. A valve for controlling the operation of a double acting hydraulic cylinder or the like having a pressure differential operated element therein, said valve comprising a valve body movable with the pressure differential operated element, a manually operable valve slidable in the valve body, said valve body having an inlet port and an outlet port on each side axially of the inlet port, means establishing hydraulic communication between the outlet ports and each side of the pressure differential operated element, a land on the valve normally closing the inlet port, peripheral grooves one on either side of the land and each in substantial alignment with an outlet port, said valve upon axial movement in the valve body bringing a peripheral groove into alignment with both the inlet and one outlet port, an abutment on the valve, an axially movable abutment on the valve body adapted to be engaged by the abutment on the valve, and means for subjecting the axially movable abutment to the pressure of the fluid in the peripheral groove in an axial direction to exert a force on the movable abutment in opposition to the manual force thereon, said movable abutment comprising a ring, means for sealing the ring with respect to the valve body, a fixed abutment on the valve body having an axially opening recess therein, and resilient means in the recess and compressed between the ring and fixed abutment urging the ring toward the abutment on the valve.

5. A valve for controlling the operation of a double acting hydraulic cylinder or the like having a pressure differential operated element therein and a rod connecting the element to the exterior thereof such that the effective area of the element on one side is less than the effective area on its other side, said valve comprising a valve body movable with the pressure differential operated element, a manually operable valve slidable in the valve body, said valve body having an inlet port connected to a source of fluid under pressure, means establishing hydraulic communication between the outlet ports and each side of the pressure differential operated element, a land on the valve normally closing the inlet port, peripheral grooves one on either side of the land and each in substantial alignment with an outlet port, said valve upon axial movement in the valve body bringing one peripheral groove into alignment with both the inlet and one outlet port, said valve body having a vent opening and said valve having passages from each peripheral groove to the vent opening and means operative upon axial movement of the valve to align a groove with the inlet port and with one outlet port to close the passage from said aligned groove to the vent opening, said means being responsive to the pressure of the fluid in the inlet port and regulating the unit pressure in the outlet port such that the effective pressure on each side of the pressure differential operated element is substantially equal, said last-mentioned means comprising a fixed abutment on the valve, an axially movable abutment on the valve body adapted to be engaged by the abutment on the valve with a substantially fluid-tight fit and subject to the pressure of the fluid in the inlet port, there being one such means for each outlet port, each movable abutment being adapted to provide a different unit pressure.

6. A valve for controlling the operation of a double acting hydraulic cylinder or the like having a pressure differential operated element therein and a rod connecting the element to the exterior thereof such that the effective area of the element on one side is less than the effective area on its other side, said valve comprising a valve body movable with the pressure differential operated element, a manually operable valve slidable in the valve body, said valve body having an inlet port connected to a source of fluid under pressure, means establishing hydraulic communication between the outlet ports and each side of the pressure differential operated element, a land on the valve normally closing the inlet port, peripheral grooves one on either side of the land and each in substantial alignment with an outlet port, said valve upon axial movement in the valve body bringing one peripheral groove into alignment with both the inlet and one outlet port, said valve body having a vent opening and said valve having passages from each peripheral groove to the vent opening, and means operative upon axial movement of the valve to align a groove with the inlet port and with one outlet port to close the passage from said aligned groove to the vent opening, said means being responsive to the pressure of the fluid in the inlet port and regulating the unit pressure in the outlet port such that the effective pressure on each side of the pressure differential operated element is substantially equal, said last-mentioned means comprising a fixed shoulder on the valve, an axially movable ring on the valve body adapted to be engaged by the abutment on the valve with a substantially fluid-tight fit and subject to the pressure of the fluid in the inlet port, means for effecting a seal between the ring and valve body, there being one such abutment and ring for each outlet port, the ring associated with the outlet port for the side of the pressure differential operated element having the lesser effective area having a greater effective area exposed to the fluid in the associated outlet port than the other ring whereby to reduce the unit pressure in that outlet port relative to the unit pressure in the other outlet port and thus to equalize the effective pressure on each side of the element as aforesaid.

References Cited in the file of this patent

UNITED STATES PATENTS

| | | |
|---|---|---|
| 2,261,444 | Neubert | Nov. 4, 1941 |
| 2,345,531 | De Ganahl | Mar. 28, 1944 |
| 2,370,137 | Biggert | Feb. 27, 1945 |
| 2,608,263 | Garrison | Aug. 26, 1952 |
| 2,674,092 | Gardiner | Apr. 6, 1954 |
| 2,708,344 | Greer | May 17, 1955 |
| 2,798,461 | Gold | July 9, 1957 |

FOREIGN PATENTS

| | | |
|---|---|---|
| 746,564 | Great Britain | Mar. 14, 1956 |

UNITED STATES PATENT OFFICE
CERTIFICATE OF CORRECTION

Patent No. 2,894,533                            July 14, 1959

Oscar H. Banker

It is hereby certified that error appears in the printed specification of the above numbered patent requiring correction and that the said Letters Patent should read as corrected below.

Column 2, line 34, strike out "incorporating the valve and safety mechanism of" and insert instead -- for operating a plurality of devices in an auto- --; column 3, line 71, for "later" read -- latter --.

Signed and sealed this 19th day of January 1960.

(SEAL)
Attest:

KARL H. AXLINE
Attesting Officer

ROBERT C. WATSON
Commissioner of Patents